United States Patent [19]
Rechtschaffen et al.

[11] Patent Number: 5,787,477
[45] Date of Patent: Jul. 28, 1998

[54] MULTI-PROCESSOR CACHE COHERENCY PROTOCOL ALLOWING ASYNCHRONOUS MODIFICATION OF CACHE DATA

[75] Inventors: Rudolph Nathan Rechtschaffen, Scarsdale; Kattamuri Ekanadham, Yorktown Heights, both of N.Y.

[73] Assignee: International Business Machines Corporation, Armonk, N.Y.

[21] Appl. No.: 665,659

[22] Filed: Jun. 18, 1996

[51] Int. Cl.$^6$ ............................................. G06F 12/00
[52] U.S. Cl. ........................... 711/141; 711/119; 711/130
[58] Field of Search ................................. 395/468, 474, 395/446, 471, 457; 711/141, 147, 119, 144, 130

[56] References Cited

U.S. PATENT DOCUMENTS

| | | |
|---|---|---|
| 4,394,731 | 7/1983 | Flusche et al. . |
| 5,197,139 | 3/1993 | Emma et al. . |
| 5,241,664 | 8/1993 | Ohba et al. . |
| 5,265,232 | 11/1993 | Gannon et al. . |
| 5,297,269 | 3/1994 | Donaldson et al. . |
| 5,317,716 | 5/1994 | Liu . |
| 5,361,368 | 11/1994 | Herzal et al. ................ 395/800 |
| 5,406,504 | 4/1995 | Denisco et al. . |
| 5,566,319 | 10/1996 | Lenz ............................ 395/474 |
| 5,603,005 | 2/1997 | Bauman et al. ............... 395/451 |

OTHER PUBLICATIONS

Censier and Feautrier, "A New Solution to Coherence Problems in Multicache Systems", IEEE Transactions on Computers, vol. c–27, No. 12, Abstract, Dec. 1978.

Handy, Jim, "The Cache Memory Book", Academic Press, Inc., pp. 158–190, and 259, 1993.

O'Krafka and Newton, "An Empirical Evaluation of Two Memory-Efficient Directory Methods", IEEE, p. 139, 1990.

"Cache Memories", Alan J. Smith, Computing Surveys, vol. 14, No. 3, Sep. 1982, pp. 473–530.

"Cache system design in the tightly coupled multiprocessor system", C.K. Tang, National Computer Conference, 1976.

*Primary Examiner*—Tod R. Swann
*Assistant Examiner*—Felix B. Lee
*Attorney, Agent, or Firm*—Jay P. Sbrollini

[57] ABSTRACT

An improved cache coherency protocol is set forth that assures that a collection of processors in a multi-cache system configuration do not disagree about the precedence ordering of store operations that can originate from any and all processors within the system. The protocol maintains coherency while allowing lines to be modified by one processor while other processors access a prior unmodified copy of the line. The benefit of such a system is that line modification need not be done only for lines that are exclusive within the cache that is associated with the modifying processor. The manner in which this coherency is achieved is through the use of line status register which maintains the status of every line in the system and a processor modification register which maintains the identity of all processors that have been granted permission to modify a line that is shared with other processors. The exclusion of the situations where the granting of modify status to a shared line which might create the opportunity for a precedence cycle to materialize is the central aspect of the invention.

28 Claims, 3 Drawing Sheets

MULTI-PROCESSOR CACHE COHERENCY PROTOCOL ALLOWING ASYNCHRONOUS MODIFICATION OF CACHE DATA

BACKGROUND OF THE INVENTION

1. Field of the Invention

The present invention relates to multi-processor systems, and, more particularly, to cache coherency in such multi-processor systems.

2. Background of the Invention

The disparity between the cycle time of a processor and memory access time forces processors to utilize a cache which contains a subset of the memory that can be accessed quickly. In a multi-processor system wherein each processor is attached to its own local cache, a coherency problem can develop unless some coordination between the contents of the local caches attached to different processors is exercised. Consider a cache which is updated whenever the attached processor performs a memory update (store) operation. Typically, such systems enforce cache coherency by requiring that when a processor wishes to modify the contents of its own cache, the memory system creates an exclusive copy of the cache line being modified in the cache of the modifying processor by invalidating all other copies of the cache line in the other caches. Such line invalidation is a time consuming operation and, if each memory update operation is synchronized to the completion of all invalidations, a substantial delay may ensue.

There is no inherent requirement that the memory system perform such steps. The essence of coherency in a multi-processor system is that all processors agree on the order in which the memory system is updated by the action of all the processors. The order for the update of memory system can be discerned by a program by examining two locations of memory. If the program inspects location A and finds that it has a new value and then examines location B and finds that it has an old value, then the program may infer that location A was updated before location B was updated. In a multi-processor system all processors must come to a common resolution of this question. This requirement has many subtle implications. For example, in a multi-processor system if a single processor issues two fetch requests (or inspection requests), these requests must be processed in sequence. If a processor issues two store requests (or update requests), these requests must be processed in sequence. If fetch requests are not processed in sequence, then there is no need to process store requests in sequence. Further within a uni-processor, a fetch request must see the last store issued by the processor that is conceptually earlier than the fetch. In a multi-processor, there is no requirement that any particular fetch request on one processor see the result of any particular store from another processor as long as there is no violation of the common inference about the order in which store operations occur within the memory subsystem. The rule which summarizes this requirement can be stated in the following manner.

There is no violation of observable order in a multi-processor system as long as there can be no occurrence of the following example.

Given a system that involves K processors $P_i$ where i=1, 2, ..., K and two sets of K memory locations, $X_i$ and $Y_i$ where $Y_i$ is a permutation of $X_i$. Each of the K processors, $P_i$, inspects $X_i$ followed by $Y_i$ and sees a new value for $X_i$ and an old value for $Y_i$. This example, called a precedence cycle, causes two or more processors to come to a contradictory inference on the order of store operations.

SUMMARY OF THE INVENTION

The object of the invention is to provide a cache coherency protocol which avoids the possibility of a precedence cycle occurring, yet does not require that only cache lines which are exclusively held by a processor may be subject to an update operation.

According to the present invention, a cache coherency protocol is set forth that allows a processor to modify data within its own cache while it still resides unmodified in another processor's cache. This is done in a manner that assures that multiple processors can not concurrently modify the same line and that the result of such modifications can not cause a forbidden precedence cycle from occurring. The rule for authorizing a processor to modify a given line is as follows:

1) the given line does not have modify status (i.e., no other processors have been granted authorization to modify the line); and 2) no other processors that share the given line (i.e., the given line is located within the cache associated with the processor) currently have been granted modify status with respect to any other line.

The principle advantage of this protocol is that the modification of an authorized line can occur without invalidating all other copies of the line in the multi-processor system, thus reducing the processing time associated with the update operation.

Other objects and advantages of the invention will become more fully understood upon consideration of the following detailed description presented in conjunction with the accompanying drawings.

DETAILED DESCRIPTION OF THE PRESENT INVENTION

Figure 1:
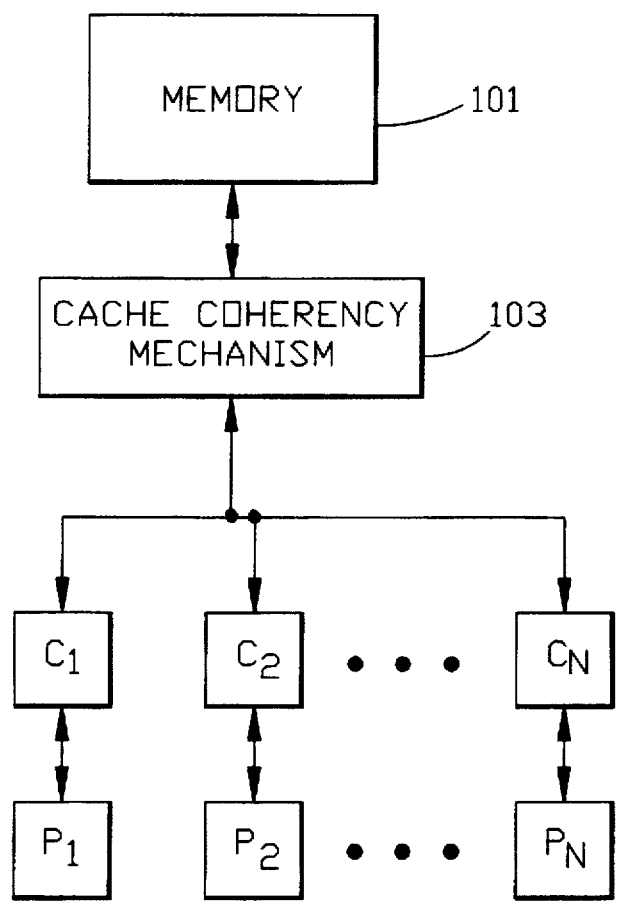
FIG. 1 is a functional block diagram of a multi-processor system embodying the present invention.
Figure 4:
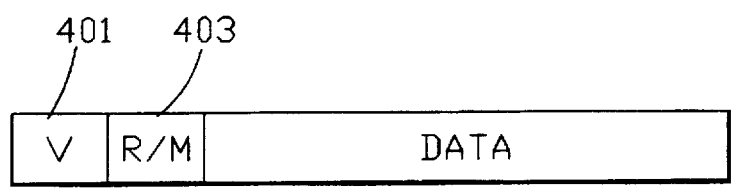
FIG. 4 is a pictorial representation of cache line stored in the local caches of FIG. 1.

As shown in FIG. 1, a multi-processor system includes a plurality of processors ($P_1, P_2, \ldots P_N$) that access a shared memory 101. Each processor is associated with a corresponding local cache ($C_1, C_2, \ldots C_N$) that stores a subset of the shared memory 101 and arranged as a plurality of lines. Each line within a given local cache preferably has two bits associated with the line as shown in FIG. 4. The first bit 401, typically referred to as a valid bit, identifies if the line has valid status or invalid status. If the first bit 401 indicates the line has valid status, the second bit 403 indicates if the line has read-only status or modify status.

The references that a processor issues to its associated local cache may be organized into two classes:

1) class 1 reference—reference where the processor does not intend to modify the given line; and 2) class 2 reference—reference where the processor intends to modify the given line.

If the processor issues a class 1 reference and the referenced line is (a) in the local cache associated with the processor and (b) has valid status with either read-only status or modify status, then the class 1 reference may be honored by transferring the requested line from the local cache to the processor.

If a processor issues a class 1 reference and the referenced line is (a) not in the local cache associated with the processor or (b) in the local cache associated with the processor but has invalid status, a cache miss (CM) request is issued. The processing of a CM request will be discussed in detail below. When the processing of the CM request is complete, the referenced line is stored in the local cache associated with the processor with valid and read-only status. The class 1 reference can then be honored by transferring the requested information from the local cache to the processor.

If a processor issues a class 2 reference and the cache line is in the local cache associated with the processor with valid and modify status, the class 2 reference is honored by allowing the referenced line stored in the local cache to be updated by the processor.

If the processor issues a class 2 reference and the cache line is in the local cache associated with the processor with valid and read-only status, a cache miss with intent to modify line present (CMIMLP) request is issued. The processing of a CMIMLP request will be discussed in detail below. When the processing of the CMIMLP request is complete, the referenced line is stored in the local cache associated with the processor with valid and modify status. The class 2 reference can then be honored by allowing the referenced line stored in the local cache to be updated by the processor.

If the processor issues a class 2 reference and referenced line is (a) not in the local cache associated with the processor or (b) present in the local cache associated with the processor with invalid status, a cache miss with intent to modify line absent (CMIMLA) request is issued. The processing of a CMIMLA request will be discussed in detail below. When the processing of the CMIMLA request is complete, the referenced line is stored in the local cache associated with the processor with valid and modify status. The class 2 reference can then be honored by allowing the referenced line stored in the local cache to be updated by the processor.

Figure 5:
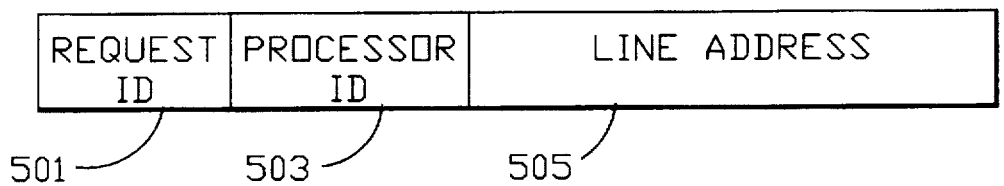
FIG. 5 illustrates the format of a request issued to the cache coherency mechanism of the present invention.

FIG. 5 illustrates the format of the CM, CMIMLP, and CMIMLA requests. Each includes a request ID field 501, a processor ID field 503, and a line address field 505. The request ID field 501 identifies the request as either a CM request, CMIMLP request or CMIMLA request. The processor ID field 503 identifies the requesting processor. And the line address field identifies the cache line associated with the request.

After determining that the requesting processor be given authorization to modify a line, the processing of the CMIMLP and the CMIMLA requests are identical with the following exception: for the CMIMLA request, the line with modify status must be transferred from its current owner to the cache of the processor which initiates the request. Moreover, when the CMIMLP request is deferred, it may be necessary to change the CMIMLP request to a CMIMLA request. Thus, for the sake of simplifying the description, the common processing of the CMIMLP request and the CMIMLA request will be referred to below the processing of a CMIM request. However, when there are differences in the processing of the CMIMLP request and the CMIMLA request, the specific differences will be detailed.

According to the present invention, a cache coherency mechanism 103 is provided that receives the CMIM request issued by a processor/cache pair and determines if the copy of the line in the cache may be granted modify status. The cache coherency mechanism of the present invention grants such modify status based upon (a) information about the line maintained by the cache coherency mechanism, and (b) information that identifies which processors have been granted modify status with respect to other lines for which modify status was requested at a point in time where the other lines may have been shared and present in the local caches associated with other processors. If the copy of the line is not granted modify status by the cache coherency mechanism, then the processing of the CMIM request is deferred until the next cache coherency reset (CCR).

Figure 2:
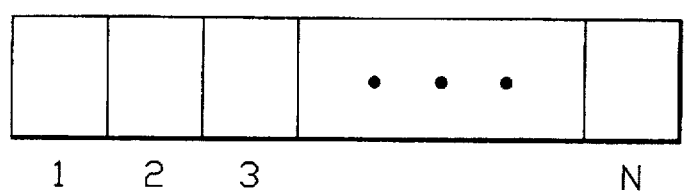
FIG. 2 is a pictorial representation of the processor modifying register of the cache coherency mechanism of FIG. 1 according to the present invention.

More specifically, the cache coherency mechanism of the present invention preferably includes a processor modifying register and a line status register. As shown in FIG. 2, the processor modifying register stores n bits each associated with one of the processors $P_1, P_2, \ldots P_N$ of the system. Each bit indicates if the associated processor has been granted modify status for a line that was shared with other processors at the point where modify status was requested. The ordering of bits within the processor modifying register preferably represents a canonical ordering of the processors $P_1, P_2 \ldots P_N$ of the system. Preferably, a bit of the processor modifying register having a binary value of '1' (or being set) indicates the associated processor has been granted modify status for a line that was shared with other processors at the point where modify status was requested, and a bit of the processor modifying register having a binary value of '0' (or being cleared) indicates the associated processor has not been granted modify status for a line that was shared with other processors at the point where modify status was requested.

Figure 3:
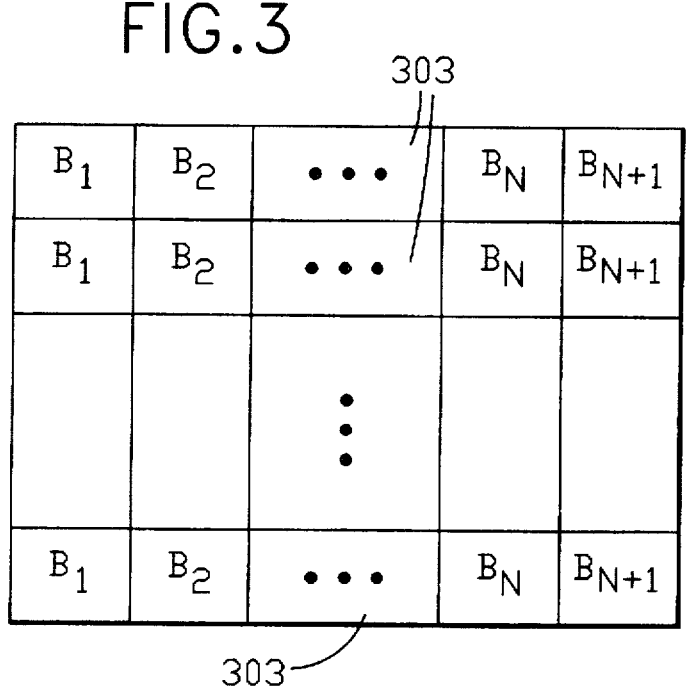
FIG. 3 is a pictorial representation of the line status register of the cache coherency mechanism of FIG. 1 according to the present invention.

As shown in FIG. 3, the line status register stores a plurality of entries 303 called line status vectors each of which is associated with a block of the shared memory 101. Preferably, the block of shared memory 101 associated with each entry is a cache line sized block, and each entry is addressed via the real memory address of cache line. Each line status vector has a length of n+1 bits. The first n bits $B_1, B_2 \ldots B_N$ of the vector specify which processors $P_1, P_2 \ldots P_N$ (preferably, using the same canonical ordering of the processors employed in the processor modify register) have or have had copies of the associated line in their cache $C_1, C_2 \ldots C_N$ since the last occurrence of a CCR which affected the associated line. Preferably, if a bit $B_1, B_2 \ldots B_N$ has a binary value of '1' (typically referred to as being set), the bit indicates the associated processor has or has had a copy of the associated line in its local cache since the last occurrence of a CCR which affected the associated line; and, if the bit has a binary value of '0' (typically referred to as being cleared), the bit indicates the associated processor does not have or has not had a copy of the associated line in its local cache since the last occurrence of a CCR which affected the associated line. The n+1 bit $B_{N+1}$ of the vector specifies if any of the processors $P_1, P_2 \ldots P_N$ have been granted modify status for the associated line. Lines that are modified (that is, have the n+1 bit $B_{N+1}$ of the associated vector in the line status register set to indicate that they are subject to modification by a processor) can be of two types:

1) SINGLETON—at most one processor (therefore, the modifying processor) has a valid copy of the line in its cache; and
2) SHARED-MODIFY—multiple processors have copies of the line and one of these processors has the line with modify status in its cache.

A SINGLETON type line as described above may be identified as follows:

1) the n+1 bit $B_{N+1}$ of the vector associated with a given line indicates the line is subject to modification by a processor; and
2) only one of the other n bits $B_1, B_2 \ldots B_N$ of the vector associated with the given line are set, thereby indicating that only a single processor has a copy of the given line.

A SHARED-MODIFY line as described above may be identified as follows:

1) the n+1 bit $B_{N+1}$ of the vector associated with a given line indicates the line is subject to modification by a processor; and
2) more than one of the other n bits $B_1, B_2 \ldots B_N$ of the vector associated with the given line are set, thereby indicating that more than one processor has a copy of the given line.

The final component of the cache coherency mechanism of the present invention is a cache line invalidator, which functions to invalidate the copies of lines that have been granted modify status while they were shared. The entire set of such lines must be treated as a class and when all lines within this class have had their copies invalidated, then a CCR can be invoked. At the conclusion of a CCR, all the lines have their associated vector in the line status register set to SINGLETON status indicating that the line has been modified and exclusive within the cache of the processor that last modified the line. In addition, the processor modifying register is set to indicate that no processor currently has modify status. All memory requests that have been deferred because of the status of lines effected by such memory request or the status of processors that share such lines can now be processed.

CMIMLP requests which are deferred because the line already had modify status are converted to CMIMLA requests because the cache line invalidator will have invalidated the copy of the line within the cache of the processor which issued the CMIMLP request. However, CMIMLP requests which are deferred because the line was shared with a processor which already had modify status can be processed as CMIMLP request as no invalidation of the copies of the line will occur as part of the action of the cache line invalidator. It is possible that a line is invalidated due to the action of an IO event. If such an invalidation occurs then deferred CMIMLP requests for the line must be converted to CMIMLA requests.

The operation of all elements of the cache coherency mechanism of the present invention is illustrated by following the actions that ensue at the point of a cache miss (CM) or a cache miss with intent to modify (CMIM). The result of such misses will either be a successful completion of the processor request or a deferral until a cache coherency reset (CCR). Preferably, the cache coherency mechanism of the present invention serializes the requests generated by all processors so that only a single CM or CMIM request is issued on any cycle.

Action on CM Request

For example, consider the scenario where a reference by processor $P_\alpha$ to local cache $C_\alpha$ of the multi-processor system results in issuance of a CM request. In this case, the cache coherency mechanism extracts from the line status register the line status vector associated with the line and examines the vector as follows:

If the n+1 bit $B_{N+1}$ of the line status vector indicates that the line is not subject to modification by a processor, then a copy of the line is delivered to the local cache $C_\alpha$ with valid and read-only status and the bit $B_\alpha$ of the line status vector corresponding to the processor $P_\alpha$ is set to '1' to indicate that processor $P_\alpha$ has a copy of the line thereby completing the processing of the CM request.

If the n+1 bit $B_{N+1}$ of the line status vector indicates that the line is subject to modification by a processor but the line is a SINGLETON with respect to a processor $P_\beta$, then the proper action will depend on whether the line is still valid within the cache $C_\beta$ associated with processor $P_\beta$. If the line is valid within the cache $C_\beta$, then a copy of the line is sent from the cache $C_\beta$ to the shared memory 101 and to the cache $C_\alpha$, and line status bits associated with the line in the caches $C_\alpha$ and $C_\beta$ are set to valid and read-only. In addition, the line status vector is updated by setting $B_{N+1}$ to '0' to reflect that the line is not subject to modification and by setting both $B_\alpha$ and $B_\beta$ to '1' to indicate that the line is shared by both processors $P_\alpha$ and $P_\beta$. If the line is no longer valid within the cache $C_\beta$, then it can be inferred that when the modified line was invalidated a copy of the modified line was sent to the shared memory 101 of the system. In this case, a copy of the line is sent from the shared memory 101 and to the cache $C_\alpha$, and line status bits associated with the line in the cache $C_\alpha$ are set to valid and read-only. In addition, the line status vector is updated by setting $B_{N+1}$ to '0' to reflect that the line is not subject to modification, by setting $B_\alpha$ to '1' to indicate that the line is held by processor $P_\alpha$, and by setting $B_\beta$ to '0' to indicate that the line is not held by processor $P_\beta$. This completes the processing of the CM request.

If the n+1 bit $B_{N+1}$ of the line status vector indicates that the line is subject to modification by a processor but the line is SHARED-MODIFY, then the processing of the CM request is deferred until a CCR occurs. The CCR resets the vector of such lines to SINGLETON status.

Action on CMIM Request

In another example, consider the scenario where a reference by processor $P_\alpha$ to local cache $C_\alpha$ of the multi-processor system results in issuance of a CMIM request. In this case, the cache coherency mechanism extracts from the line status register the vector associated with the line and examines the vector as follows:

If the following two conditions occur:

1) the n+1 bit $B_{n+1}$ of the line status vector indicates the line is not subject to modification by a processor, and
2) either the first n bits of the line status vector are cleared thereby indicating that no processor has a copy of the line, or only the bit (of the first n bits of the vector) associated with the processor $P_\alpha$ is set thereby indicating that only processor $P_\alpha$ has or has had a copy of the line, then the operation depends upon whether the request is a CMIMLA request or a CMIMLP request. If the request is a CMIMLA request, the line is delivered from the shared memory 101 to the local cache $C_\alpha$ associated with the processor $P_\alpha$ with a valid modify status. If the request is a CMIMLP request, the line status bits of the line within the cache $C_\alpha$ i set to valid modify status. In either case, the line status vector associated with the line in the line status register is updated to represent that the line is a SINGLETON. This preferably is accomplished by setting only one bit (of the first n bits of the vector) associated with the processor $P_\alpha$ and setting the n+1 bit of the vector to indicate the line is subject to modification by a processor. The CMIM is completed.

If the following two conditions occur:

1) the n+1 bit $B_{N+1}$ of the line status vector indicates the line is not subject to modification by a processor, and
2) the first n bits of the line status vector indicate at least one processor other than the processor $P_\alpha$ has a copy of the line, then the first n bits of the line status vector associated with each of the processors are compared to the corresponding bits of the processor modifying register. If any corresponding bit pairs of the vector and processor modifying register, other than the bit pair associated with the processor $P_\alpha$, are set, then the processing of the CMIM request is deferred until the CCR occurs. The CCR clears the processor modifying register. If there are no corresponding bit pairs other than the bit pair associated with the processor $P_\alpha$, then the following actions are taken:

If the request is a CMIMLA request, then the line is delivered to the local cache $C_\alpha$ associated with the processor $P_\alpha$. If the request is a CMIMLP request, no line movement is required.

The line is assigned modify status in the cache $C_\alpha$.

the n+1 bit $B_{N+1}$ of the line status vector associated with the line is set to indicate the line is subject to modification by a processor;

the bit of the first n bits of the line status vector associated with the processor $P_\alpha$ is set to thereby indicate that the processor $P_\alpha$ has a copy of the line.

information concerning invalidation of sharers of this line is provided to the cache line invalidator (a more detailed description of the information is set forth below); and the bit of the processor modifying register corresponding to the processor $P_\alpha$ is set (thereby indicating the processor $P_\alpha$ is now one of the processors that must be checked on all future requests to grant modify status to the shared line, and the processing of the CMIM request is completed.

If the line is SHARED-MODIFY, then the processing of the CMIM request is deferred until the CCR occurs. The CCR converts the line to a SINGLETON.

If the line is a SINGLETON with respect to a processor $P_\beta$, then the following actions are taken:

the line status vector is updated to represent the line is a SINGLETON with respect to processor $P_\alpha$. This preferably is accomplished by setting only one bit (of the first n bits of the vector) associated with the processor $P_\alpha$ and retaining the n+1 bit $B_{N+1}$ of the vector to indicate the line continues to be subject to modification by a processor;

the line is delivered from the local cache associated with the processor $P_\beta$ to the local cache associated with the processor $P_\alpha$;

the line is marked invalid in the local cache associated with the processor $P_\beta$ and marked valid with modify status in the local cache associated with the processor $P_\alpha$, and the processing of the CMIM request is completed.

The cache line invalidator invalidates the cache entries for all sharing users of a given line utilizing the line address, its associated line status vector which is stored in the line storage register, and the identity of the processor $P_\gamma$ that has been granted the valid-modify within its cache directory and therefore is the sole processor with the ability to modify the given line. A list of such requests are maintained by the cache line invalidator. When all sharing users have been invalidated, the cache line invalidator declares a cache coherency reset (CCR).

In order to process the CCR, the cache line invalidator updates the line status vector of the line status register associated with each pending line to identify the line as a SINGLETON, thereby representing that the line has been modified and exclusive within the cache of the processor that last modified the line. In addition, the processor modifying register is set to indicate that no processor currently has modify status.

In summary, the cache coherency protocol of the present invention decouples the invalidation of shared copies of a line that a single processor wished to modify from the granting of modify status. Thus, invalidations can occur asynchronously within the system while the processors continue to access and modify their individual caches. This eliminates the delay that may arise when utilizing conventional cache coherency protocols that require invalidation prior to line modification.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a multi-processor system having a plurality of processors and associated local caches, a method for maintaining coherency of data stored in the local caches, the method comprising the steps of:

storing in a first memory first data identifying the processors that have been granted authorization to modify a block of data shared by more than one processor;

storing in a second memory second data identifying, for a given block of data stored in at least one of the local caches, a) the processors having a copy of the given block of data stored in the local caches associated with the processors; and b) whether any of the processors have been authorized to modify the given block of data;

in response to a reference issued by a particular processor to modify a given block of data, determining whether to grant authorization to the particular processor to modify the given block of data according to the first data stored in the first memory and the second data associated with the given block of data stored in the second memory.

2. The method of claim 1, wherein the first data stored in the first memory comprises a plurality of bits each associated with a processor, wherein each bit represents whether the associated processor has been granted authorization to modify a block of data shared by more than one processor.

3. The method of claim 1, wherein the second data that is associated with the given block of data and stored in the second memory comprises a plurality of bits each associated with a processor, wherein each bit represents whether the associated processor has a copy of the given block of data stored in the local cache associated with the processor.

4. The method of claim 1, wherein the second data that is associated with the given block of data and stored in the second memory comprises a bit that represents whether any of the processors have been authorized to modify the given block of data.

5. The method of claim 1, wherein the determining step comprises the following step:

if the second data associated with the given block of data indicates that i) no processor has been authorized to modify the given block of data, and ii) at least one other processor $P_1$, other than the particular processor, has a copy of the given block of data in the local cache associated with the processor $P_1$, then comparing the first data to the second data associated with the given block of data to determine if any other processor $P_2$, other than the particular processor, satisfies the following two conditions:

1) the processor $P_2$ has been granted authorization to modify a block of data shared by more than one processor, and 2) the processor $P_2$ has a copy of the given block of data in the local cache associated with the processor $P_2$.

6. The method of claim 5, wherein if the compare step determines that a processor, other than the particular processor, satisfies the two conditions 1) and 2), the processing of the request is deferred until a reset operation is performed.

7. The method of claim 6, wherein the reset operation includes the following steps:

maintaining a list of deferred requests;

for each deferred request in the order received, identifying a sole processor which has been granted authorization to modify the given block of data identified in the deferred request, and invalidating the given block of data in all local caches that share the given block of data identified in the deferred request;

after processing all deferred requests, updating the first data stored in the first memory to indicate that no processor has been granted authorization to modify a block of data shared by more than one processor, and updating the second data stored in the second memory to indicate that only the sole processor has a copy of the given block of data in the local caches associated with the sole processor and that no other processor other than the sole processor has been authorized to modify the given block of data.

8. The method of claim 5, wherein if the compare step determines that no processor, other than the particular processor, satisfies the two conditions 1) and 2), performing the following steps:

updating the second data associated with the given block of data that is stored in the second memory to indicate:

a) the given block of data is subject to modification by a processor, and b) the particular processor has a copy of the given block of data;

updating the first data stored in the first memory to indicate that the particular processor has been granted authorization to modify a block of data shared by more than one processor; and authorizing the particular processor to update the given block of data stored in the local cache associated with the particular processor.

9. The method of claim 8, wherein if the compare step determines that no processor, other than the particular processor, satisfies the two conditions 1) and 2), performing the following step:

delivering the given block of data from a shared memory to the local cache associated with the particular processor.

10. The method of claim 1, wherein the determining step comprises the step of determining if the second data associated with the given block of data indicates that i) a processor has been authorized to modify the given block of data, and ii) more than one processor has a copy of the given block of data in the local cache associated with the processor; and if conditions i) and ii) are satisfied, the method further comprises the step of deferring the processing of the request until a reset operation is performed.

11. The method of claim 10, wherein the reset operation includes the following steps:

maintaining a list of deferred requests;

for each deferred request in the order received, identifying a sole processor which has been granted authorization to modify the given block of data identified in the deferred request, and invalidating the given block of data in all local caches that share the given block of data identified in the deferred request;

after processing all deferred requests, updating the first data stored in the first memory to indicate that no processor has been granted authorization to modify a block of data shared by more than one processor, and updating the second data stored in the second memory to indicate that only the sole processor has a copy of the given block of data in the local caches associated with the sole processor and that no other processor other than the sole processor has been authorized to modify the given block of data.

12. The method of claim 1, wherein the determining step comprises the step of determining if the second data associated with the given block of data indicates that i) a processor has been authorized to modify the given block of data, and ii) only one other processor, other than the particular processor, has a copy of the given block of data in the local cache associated with the processor; and if conditions i) and ii) are satisfied, the method further comprises the follow steps:

updating the second data associated with the given block of data that is stored in the second memory to indicate that:

1) only the particular processor has a copy of the given block of data in the local cache associated with the particular processor, and 2) a processor has been authorized to modify the given block of data;

delivering the given block of data from the local cache associated with the one other processor to the local cache associated with the particular processor;

unauthorizing the one other processor to update the given block of data stored in the local cache associated with the one other processor; and authorizing the particular processor to update the given block of data stored in the local cache associated with the particular processor.

13. The method of claim 1, wherein the determining step comprises the step of determining if the second data associated with the given block of data indicates that i) no processor has been authorized to modify the given block of data, and either ii) no processor has a copy of the given block of data in the local cache associated with the processor or iii) no other processor, other than the particular processor, has a copy of the given block of data in the local cache associated with the processor; and if conditions i) and either ii) or iii) are satisfied, the method further comprises the follow steps:

updating the second data associated with the given block of data that is stored in the second memory to indicate that:
1) only the particular processor has a copy of the given block of data in the local cache associated with the particular processor, and
2) a processor has been authorized to modify the given block of data; and authorizing the particular processor to update the given block of data stored in the local cache associated with the particular processor.

14. The method of claim 13, wherein if the second data associated with the given block of data indicates that i) no processor has been authorized to modify the given block of data, and either ii) no processor has a copy of the given block of data in the local cache associated with the processor or iii) no other processor, other than the particular processor, has a copy of the given block of data in the local cache associated with the processor, then delivering the given block of data from a shared memory to the local cache associated with the particular processor.

15. In a multi-processor system having a plurality of processors and associated local caches, an apparatus for maintaining coherency of data stored in the local caches, the apparatus comprising:

a first memory storing first data identifying the processors that have been granted authorization to modify a block of data shared by more than one processor;

a second memory storing second data identifying, for a given block of data stored in at least one of the local caches,
a) the processors having a copy of the given block of data stored in the local caches associated with the processors; and
b) whether any of the processors have been authorized to modify the given block of data;

coherence logic, coupled to said first and second memories, that, in response to a reference issued by a particular processor to modify a given block of data, determines whether to grant authorization to the particular processor to modify the given block of data according to the first data stored in the first memory and the second data associated with the given block of data stored in the second memory.

16. The apparatus of claim 15, wherein the first data stored in the first memory comprises a plurality of bits each associated with a processor, wherein each bit represents whether the associated processor has been granted authorization to modify a block of data shared by more than one processor.

17. The apparatus of claim 15, wherein the second data that is associated with the given block of data and stored in the second memory comprises a plurality of bits each associated with a processor, wherein each bit represents whether the associated processor has a copy of the given block of data stored in the local cache associated with the processor.

18. The apparatus of claim 15, wherein the second data that is associated with the given block of data and stored in the second memory comprises a bit that represents whether any of the processors have been authorized to modify the given block of data.

19. The apparatus of claim 15, wherein the coherence logic determines whether to grant authorization to the particular processor to modify the given block of data by:

determining if the second data associated with the given block of data indicates that i) no processor has been authorized to modify the given block of data, and ii) at least one other processor $P_1$, other than the particular processor, has a copy of the given block of data in the local cache associated with the processor $P_1$;

upon determining conditions i) and ii) are satisfied, comparing the first data to the second data associated with the given block of data to determine if any other processor $P_2$, other than the particular processor, satisfies the following two conditions:
1) the processor $P_2$ has been granted authorization to modify a block of data shared by more than one processor, and
2) the processor $P_2$ has a copy of the given block of data in the local cache associated with the processor $P_2$.

20. The apparatus of claim 19, wherein the coherence logic, upon determining that a processor, other than the particular processor, satisfies the two conditions 1) and 2), defers processing of the request until a reset operation is performed.

21. The apparatus of claim 20, further comprising means for performing said reset operation including:

a buffer storing a list of deferred requests;

invalidation means, which for each deferred request in the order received,
identifies a sole processor which has been granted authorization to modify the given block of data identified in the deferred request, and
invalidates the given block of data in all local caches that share the given block of data identified in the deferred request;

update means, which after processing all deferred requests,
updates the first data stored in the first memory to indicate that no processor has been granted authorization to modify a block of data shared by more than one processor, and
updates the second data stored in the second memory to indicate that only the sole processor has a copy of the given block of data in the local caches associated with the sole processor and that no other processor other than the sole processor has been authorized to modify the given block of data.

22. The apparatus method of claim 19, wherein the coherence logic, upon determining that no processor, other than the particular processor, satisfies the two conditions 1) and 2):

updates the second data associated with the given block of data that is stored in the second memory to indicate
a) the given block of data is subject to modification by a processor, and
b) the particular processor has a copy of the given block of data;

updates the first data stored in the first memory to indicate that the particular processor has been granted authorization to modify a block of data shared by more than one processor; and authorizes the particular processor to update the given block of data stored in the local cache associated with the particular processor.

23. The apparatus of claim 22, wherein the coherence logic, upon determining that no processor, other than the particular processor, satisfies the two conditions 1) and 2), delivers the given block of data from a shared memory to the local cache associated with the particular processor.

24. The apparatus of claim 15, wherein the coherence logic determines whether to grant authorization to the particular processor to modify the given block of data by determining if the second data associated with the given block of data indicates that i) a processor has been authorized to modify the given block of data, and ii) more than one processor has a copy of the given block of data in the local cache associated with the processor; and wherein the coherence logic, upon determining that conditions i) and ii) are satisfied, defers the processing of the request until a reset operation is performed.

25. The apparatus of claim 24, further comprising means for performing said reset operation including:

a buffer storing a list of deferred requests;

invalidation means, which for each deferred request in the order received, identifies a sole processor which has been granted authorization to modify the given block of data identified in the deferred request, and invalidates the given block of data in all local caches that share the given block of data identified in the deferred request;

update means, which after processing all deferred requests, updates the first data stored in the first memory to indicate that no processor has been granted authorization to modify a block of data shared by more than one processor, and updates the second data stored in the second memory to indicate that only the sole processor has a copy of the given block of data in the local caches associated with the sole processor and that no other processor other than the sole processor has been authorized to modify the given block of data.

26. The apparatus of claim 15, wherein the coherence logic determines whether to grant authorization to the particular processor to modify the given block of data by determining if the second data associated with the given block of data indicates that i) a processor has been authorized to modify the given block of data, and ii) only one other processor, other than the particular processor, has a copy of the given block of data in the local cache associated with the processor; and wherein the coherence logic, upon determining that conditions i) and ii) are met, updates the second data associated with the given block of data that is stored in the second memory to indicate that:
1) only the particular processor has a copy of the given block of data in the local cache associated with the particular processor, and
2) a processor has been authorized to modify the given block of data;

delivers the given block of data from the local cache associated with the one other processor to the local cache associated with the particular processor;

unauthorizes the one other processor to update the given block of data stored in the local cache associated with the one other processor; and authorizes the particular processor to update the given block of data stored in the local cache associated with the particular processor.

27. The apparatus of claim 15, wherein the coherence logic determines whether to grant authorization to the particular processor to modify the given block of data by determining if the second data associated with the given block of data indicates that i) no processor has been authorized to modify the given block of data, and either ii) no processor has a copy of the given block of data in the local cache associated with the processor or iii) no other processor, other than the particular processor, has a copy of the given block of data in the local cache associated with the processor; and wherein the coherence logic, upon determining that conditions i) and either ii) or iii) are satisfied, updates the second data associated with the given block of data that is stored in the second memory to indicate that:
1) only the particular processor has a copy of the given block of data in the local cache associated with the particular processor, and
2) a processor has been authorized to modify the given block of data; and authorizes the particular processor to update the given block of data stored in the local cache associated with the particular processor.

28. The apparatus of claim 27, wherein the coherence logic, upon determining that conditions i) and either ii) or iii) are satisfied, delivers the given block of data from a shared memory to the local cache associated with the particular processor.

* * * * *